(12) United States Patent
Carnahan et al.

(10) Patent No.: US 8,608,085 B2
(45) Date of Patent: Dec. 17, 2013

(54) MULTI-POLE SWITCH STRUCTURE, METHOD OF MAKING SAME, AND METHOD OF OPERATING SAME

(75) Inventors: David Carnahan, Needham, MA (US); Iosif Izrailit, Newton, MA (US)

(73) Assignee: NanoLab, Inc., Waltham, MA (US)

( * ) Notice: Subject to any disclaimer, the term of this patent is extended or adjusted under 35 U.S.C. 154(b) by 0 days.

(21) Appl. No.: 13/274,786

(22) Filed: Oct. 17, 2011

(65) Prior Publication Data

US 2012/0211568 A1 Aug. 23, 2012

Related U.S. Application Data

(60) Provisional application No. 61/393,644, filed on Oct. 15, 2010.

(51) Int. Cl.
  *G06K 19/06* (2006.01)
(52) U.S. Cl.
  USPC .......................................................... 235/492
(58) Field of Classification Search
  USPC .......................................... 235/492; 200/181
  See application file for complete search history.

(56) References Cited

U.S. PATENT DOCUMENTS

| | | | |
|---|---|---|---|
| 5,258,591 A | 11/1993 | Buck | |
| 5,578,976 A | 11/1996 | Yao | |
| 6,307,169 B1 * | 10/2001 | Sun et al. | 200/181 |
| 6,445,006 B1 | 9/2002 | Brandes et al. | |
| 6,548,841 B2 | 4/2003 | Frazier et al. | |
| 6,863,942 B2 | 3/2005 | Ren et al. | |
| 6,950,296 B2 | 9/2005 | Carnahan | |
| 7,839,242 B1 * | 11/2010 | Hopper et al. | 335/87 |
| 8,174,342 B2 * | 5/2012 | Min et al. | 333/262 |
| 2006/0065740 A1 * | 3/2006 | Lyons et al. | 235/492 |

OTHER PUBLICATIONS

Rueckes, Thomas et al., Carbon Nanotube-Based Nonvolatile Random Access Memory for Molecular Computing, Science, Jul. 2000, pp. 94-97.
Roukes, Michael, Nanoelectromechanical Systems Face the Future, Physics World, Feb. 2001, vol. 14, Issue 2.
Kinaret, J.M. et al., A Carbon-Nanotube-Based Nanorelay, Applied Physics Letters, Feb. 24, 2003, pp. 1287-1289, vol. 82, No. 8.
Dujardin, E., et al., Self-Assembled Switches Based on Electroactuated Multiwalled Nanotubes, Applied Physics Letters, 2005, vol. 87.
Jang, J.E., et al., Nanoelectromechanical Switches With Vertically Aligned Carbon Nanotubes, Applied Physics Letters, 2005, vol. 87.

* cited by examiner

*Primary Examiner* — Seung Lee
(74) *Attorney, Agent, or Firm* — Pandiscio & Pandiscio

(57) ABSTRACT

A multi-pole switch comprising a conducting substrate; at least three field electrodes mounted above, and electrically isolated from, each other and from said conducting substrate; a conductive cantilever element having a first end portion secured to said conducting substrate, an opposite second free end portion positioned in spaced relation to said field electrodes and operable in response to an electrostatic or electrodynamic charge established between said cantilever element and said field electrodes to deflect in a direction towards said field electrodes; and a plurality of contact electrode poles mounted above, and electrically isolated from, said conducting substrate below the top of said cantilever element second free end portion and above said field electrodes and positioned to contact said cantilever element as said cantilever element is deflected in a direction defined by the net field applied by said field electrodes.

21 Claims, 9 Drawing Sheets

Electrostatic Switch

Cantilever Switch

Relay Device

MULTI-POLE SWITCH STRUCTURE, METHOD OF MAKING SAME, AND METHOD OF OPERATING SAME

REFERENCE TO PENDING PRIOR PATENT APPLICATION

This patent application claims benefit of pending prior U.S. Provisional Patent Application Ser. No. 61/393,644 filed Oct. 15, 2010 by David Carnahan et al. for MULTI-POLE SWITCH STRUCTURE, METHOD OF MAKING, AND METHOD OF OPERATING SAME, which patent application is hereby incorporated herein by reference.

FIELD OF THE INVENTION

This invention relates to nanoscale devices in general, and more particularly to a nanoscale multi-pole switching device particularly suited to allow one electrode to make sequential electrical contact with a number of other electrodes, and to the fabrication and operation of the same.

BACKGROUND OF THE INVENTION

It is known in the art to use cantilevers with electrostatic forces to close an electrical contact. Buck (in U.S. Pat. No. 5,258,591), Frasier (in U.S. Pat. No. 6,548,841), and Yao (in U.S. Pat. No. 5,578,976), for example, all disclose an RF switch that is operated through the application of electrostatic forces. However, these all utilize cantilevered beams that are parallel to a substrate, thereby taking up significant real estate on the chip. Furthermore, these beams can deflect in one direction only. Brandes (in U.S. Pat. No. 6,445,006) discloses a switch with two positions, where the cantilever moves in a line from its rest position forward to touch one contact or back to touch another contact. By these constructions, the cantilever is limited in the number of contacts that it can make. The present invention enables a multi-pole switch that can make selective contact with more than two electrodes, and therefore enables more complex electrical switching operations to be carried out.

It is also known in the art to produce carbon nanotubes that can stand vertically from a substrate. The nanotubes grown by plasma enhanced chemical vapor deposition techniques, described by Ren (U.S. Pat. No. 6,863,942) are freestanding, and can be considered as vertically oriented cantilever beams. I, David Carnahan, in U.S. Pat. No. 6,950,296, described the actuation of these nanotubes using electrostatic and electrodynamic forces to create a multi-element tweezer/grasping device. AC voltages with phase shifts were imposed on the various nanotubes in the device, with the goal of making the nanotubes come together to grasp objects. As described in my U.S. Pat. No. 6,950,296, this invention described sequential contact of individual electrical contacts only through phase lag between multiple cantilever elements.

To increase the utility of a switch, it is the goal of this invention to provide multiple directions of deflection for a cantilever, and more than two contact electrodes for a given cantilever, thus creating a novel multi-pole switch.

SUMMARY OF THE INVENTION

Accordingly, it has occurred to this inventor that the tip or shaft of a vertically aligned (Z direction) nanotube can be deflected in both the X and Y directions, simultaneously, through the application of electrostatic and/or electrodynamic forces, and thus can sequentially make contact with multiple electrodes. Such a device can function as a multi-pole switch, where the nanotube is connected at its root (i.e., base) to an electrode on the substrate, and the opposite end of the nanotube is free to bend and touch any one of a number of other contact electrodes. This action can be electrostatic in nature, where a static voltage is applied to a single field electrode, and this drives the tip of the nanotube into contact with the contact electrode. However, the electrodynamic case, where two or more field electrode pairs are used to excite the nanotube into vibration, has greater utility. When the voltage on one pair of field electrodes is driven by a time-varying function, and the voltage on another orthogonal pair of field electrodes is driven by either the same time-varying function with a phase lag or by another time-varying function, complex but predictable oscillations of the nanotube will occur. The tip of the nanotube will follow a predictable pattern dictated by the combination of the X and Y drive functions. Given that the path of the nanotube tip under these conditions can be predicted, it is possible to place contact electrodes at points along the nanotube's path, such that the nanotube will make momentary contact with each electrode in turn. Certain combinations of drive functions will result in the path of the nanotube having a pattern that features a number of lobes in defined locations. The tips of these lobes are preferred locations for the placement of contact electrodes. If the nanotube element is made from a multiwall carbon nanotube or other nested structure, it may be free to telescope under the electrostatic attractive forces and thereby become longer, which can allow it to reach more distant electrodes. Further, the tip of the nanotube element, being conducting, may also undergo field emission, emitting a beam of electrons in a direction defined by the nanotube element's position.

In one preferred form of the present invention, there is provided a multi-pole switch comprising:

(a) a conducting substrate having a top surface;

(b) at least three field electrodes mounted above, and electrically isolated from, each other and from said top surface of said conducting substrate;

(c) a conductive cantilever element having a first end portion secured to said top surface of said conducting substrate, an opposite second free end portion positioned in spaced relation to said field electrodes and operable in response to an electrostatic or electrodynamic charge established between said cantilever element and said field electrodes to deflect in a direction towards said field electrodes; and (d) a plurality of contact electrode poles mounted above, and electrically isolated from, said top surface of said conducting substrate below the top of said cantilever element second free end portion and above said field electrodes and positioned to contact said cantilever element as said cantilever element is deflected in a direction defined by the net field applied by said field electrodes.

In another preferred form of the present invention, there is provided a method for switching a signal, the method comprising:

providing a multi-pole switch comprising:

(a) a conducting substrate having a top surface;

(b) at least three field electrodes mounted above, and electrically isolated from, each other and from said top surface of said conducting substrate;

(c) a conductive cantilever element having a first end portion secured to said top surface of said conducting substrate, an opposite second free end portion positioned in spaced relation to said field electrodes and operable in response to an electrostatic or electrodynamic charge established between said cantilever element and said field electrodes to deflect in a direction towards said field electrodes; and (d) a plurality of contact electrode poles mounted above, and electrically isolated from, said top surface of said conducting substrate below the top of said cantilever element second free end portion and above said field electrodes and positioned to contact said cantilever element as said cantilever element is deflected in a direction defined by the net field applied by said field electrodes; and applying a voltage to said field electrodes and applying a signal to said contact electrodes.

In another preferred form of the present invention, there is provided a switch comprising:

a cantilevered, nanoscale element extending from a substrate;

two or more field electrodes orthogonal to said element; and two or more contact electrodes, wherein said field electrodes are stimulated by different voltage sources.

In another preferred form of the present invention, there is provided a multi-pole switch structure comprising:

a cantilevered nanoscale element extending from a substrate;

one field electrode positioned along the length of said element, providing a gap therebetween;

a second field electrode positioned substantially orthogonal to the first field electrode; and two or more contact electrodes positioned along the length of said element.

In another preferred form of the present invention, there is provided a switch made from a cantilevered conductive filament that oscillates in a closed loop pattern, making contact between said cantilevered conductive filament and electrical contacts that are placed along the path of the closed loop.

In another preferred form of the present invention, there is provided a radio frequency identification device, comprising:

an antenna;

a charging circuit;

one or more multi-pole switches driven by oscillating voltages; and capacitors which can be connected to the individual poles.

In another preferred form of the present invention, there is provided a cantilevered nanotube, whose free end is driven into a periodic oscillation in more than one direction.

BRIEF DESCRIPTION OF THE DRAWINGS

These and other objects, features and advantages of the present invention will be more fully disclosed or rendered obvious by the following detailed description of the preferred embodiments of the invention, which is to be considered together with the accompanying drawings wherein like numbers refer to like parts and further wherein.

DETAILED DESCRIPTION OF THE PREFERRED EMBODIMENTS

Figure 1:
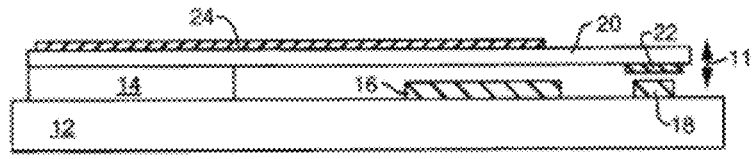
FIG. 1 illustrates the prior art in cantilever switches from Yao (U.S. Pat. No. 5,578,976)
Figure 2:
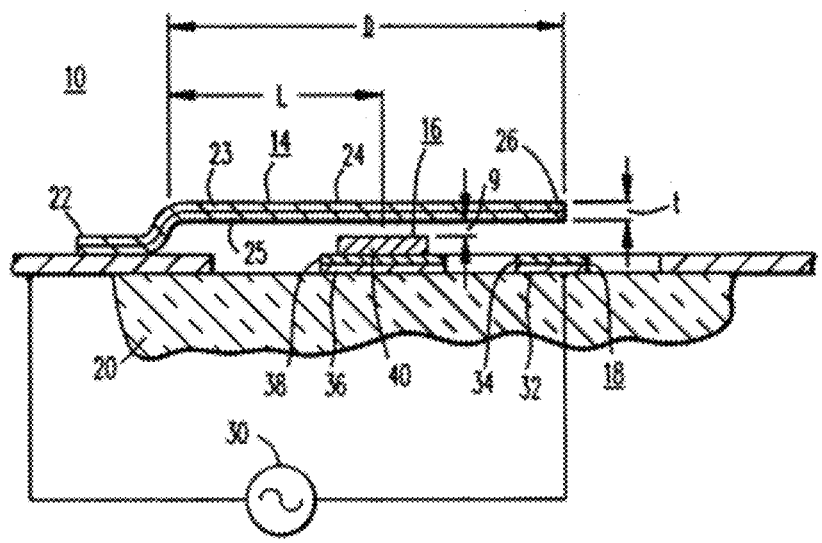
FIG. 2 illustrates additional prior art in electrostatic switches from Buck (U.S. Pat. No. 5,258,591)
Figure 3:
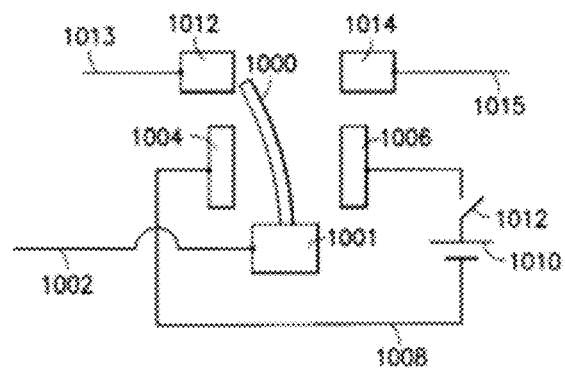
FIG. 3 is a third illustration of the prior art by Brandes (U.S. Pat. No. 6,445,006)

The present invention comprises the use of a cantilevered electrode that may be deflected by multiple field electrodes, resulting in deflection in any desired direction, so that the cantilever makes electrical contact with electrodes surrounding the cantilever. To distinguish this invention from the prior art, a review of the prior art will be useful. Now referring only to FIG. 1, the cantilever arm 20 is parallel to the substrate 12, and single axis displacement 11 can be achieved with this construction. This design, by virtue of being horizontal, occupies significant real estate on the chip, and allows contact of the cantilever electrode 22 with only one contact electrode 18. Now referring only to FIG. 2, a switch is shown that operates in a fundamentally similar way to that of FIG. 1, except that the thicker pull down electrode 40 reduces the field necessary for actuation. Now referring only to FIG. 3, there is shown a relay device having a pair of oppositely facing electrodes between which is a carbon microfiber element 1000 mounted on a base structure. The carbon microfiber element may electrostatically deflect in either direction to contact a pair of contact electrodes. Such a construction allows only straight line deflection of the cantilever, i.e., toward an electrode, and therefore a maximum of two contacts can be positioned at the extremes of the cantilever motion.

One of the aspects of this invention is the multi-pole operation that can be achieved by deflecting the cantilever in two directions by orthogonal pairs of field electrodes, which can be energized with time-varying functions that result in patterns having lobes.

Figures 4A, 4B, 4C, 4D, 4E:
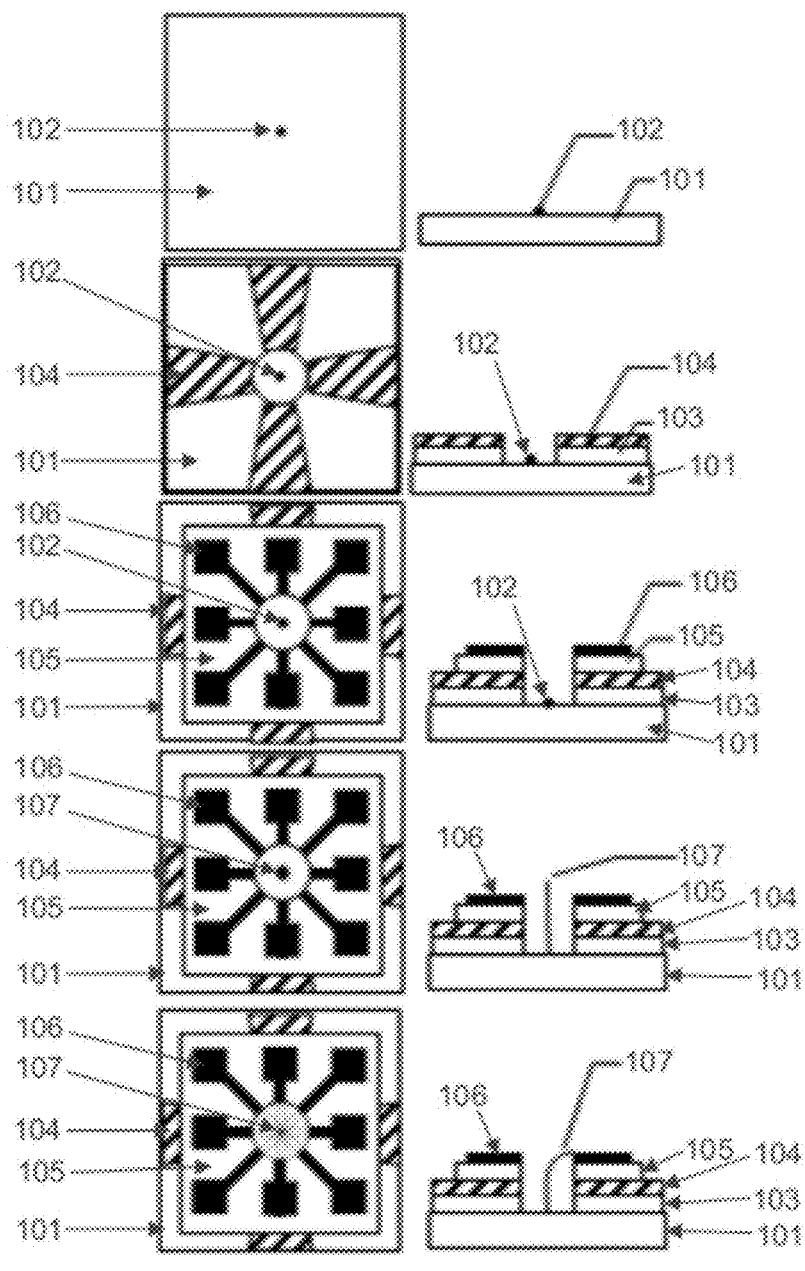
FIGS. 4A-4E depict a process flow for producing a multi-pole switch structure in accordance with the present invention.

One illustrative procedure for producing a multi-pole switch device according to the present invention is shown in FIGS. 4A-4E. In FIG. 4A, a substrate 101 is positioned and a catalytic metal nanoparticle 102 is deposited on the substrate. In FIG. 4B, an insulating layer 103 is deposited on the substrate and then metallized with a number of field electrodes 104. The area surrounding the catalytic nanoparticle is kept clear. In FIG. 4C, a second insulating layer 105 is deposited (e.g., atop the field electrodes), and a number of contact electrodes 106 are then deposited atop the insulating layer. Again, the area surrounding the catalyst nanoparticle is kept clear of deposits. In FIG. 4D, an aligned carbon nanotube or nanofiber 107 is grown from the catalytic nanoparticle. In FIG. 4E, each pair of field electrodes 104 is energized with a sinusoidal voltage, sufficient to induce oscillation of the nanotube 107 in an eight-lobed Rose pattern such that the nanotube contacts each of the eight contact electrodes 106 sequentially.

Figure 5A:
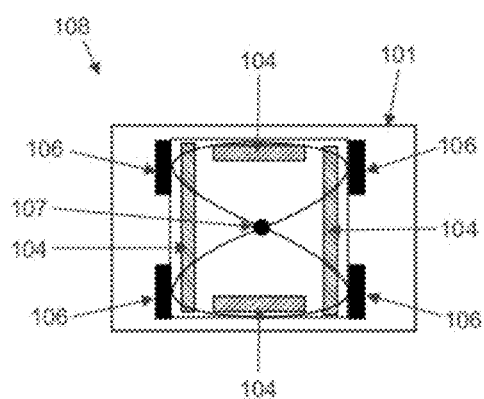
FIG. 5A is a top view depiction of a four-lobed Lissajous-type oscillation produced by two sets of orthogonal field electrodes operating on sinusoidal inputs.
Figure 5B:
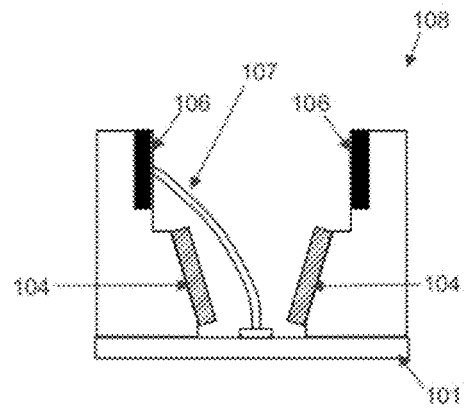
FIG. 5B is a section view that depicts a nanotube bent under the electrostatic forces so as to touch one of the contact electrodes.

Now referring to FIGS. 5A and 5B, there is shown a multi-pole switch 108 formed in accordance with the present invention. In switch 108, the nanotube 107 touches the four contact electrodes 106 sequentially, following the voltage applied on the field electrodes 104. A Lissajous curve is the graph produced by a pair of equations having the form:

$$x = A \sin(\alpha t + \delta)$$

and $$y = B \sin(\beta t)$$

which describe complex harmonic motion. The curve that is produced is sensitive to the terms in each equation. When $\alpha/\beta = 1$, the curve becomes an ellipse, and if A=B, then a circle will form, if $\delta = \pi/2$ radians. A line will form if $\delta = 0$. So long as $\alpha/\beta$ is a rational number (the quotient of two integers), then complex, but closed, curves will occur. The Lissajous curve in FIG. 5A is formed by excitation of the field electrodes having two functions, the aforementioned x and y functions, where $\alpha = 1$, $\beta = 2$ and $\delta = \pi/2$. In FIG. 5A, which is seen as a top view, the aligned nanotube's tip or side will touch the four contact electrodes at the periphery of the figure in a repeating pattern. Specifically, the Lissajous pattern of FIG. 5A is formed by $X = A \sin(t + \pi/2)$, $Y = B \sin(2t)$. The nanotube's rest position is at the center of FIG. 5A.

Figure 6A:
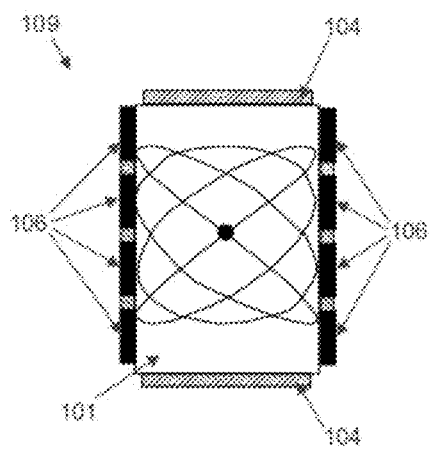
FIG. 6A is a top view of a nanotube being deflected so as to sequentially touch each of eight contact electrodes, thereby making a Lissajous figure.
Figure 6B:
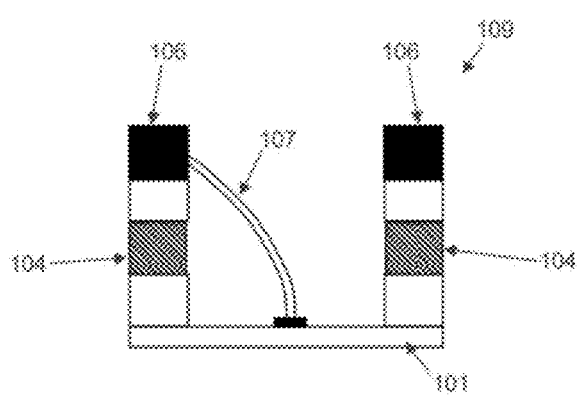
FIG. 6B is a section view revealing the position of one pair of field electrodes—the field on these electrodes and the other pair (not shown in FIG. 6B) follow sinusoidal functions that generate the Lissajous motion.

Now referring to FIGS. 6A and 6B, there is shown a multi-pole switch 109 also formed in accordance with the present invention. Switch 109 is an eight pole switch is created through the use of a more complex Lissajous pattern than was used in FIG. 5A. The pattern formed by the excitation of the field electrodes 104 by two functions, having $\alpha = 3$, $\beta = 4$, and $\delta = \pi/2$, results in an eight lobed figure. An oscillating cantilever that follows this pattern will touch each of the eight contact electrodes 106 in sequence. We note that two additional contacts could be placed at the two additional inflection points in the figure. One general feature of Lissajous curves is that they form roughly rectangular shapes.

Those Lissajous figures that pass through the origin are favored for the rest position of the cantilever, and this occurs when $\delta$ is a multiple of it or $\pi/n$ (where n is an integer).

An example of another class of equations that can be used favorably with the present invention are hypotrochoids, which follow the equation:

$$X = (R-r)\cos\Theta + \delta \cos(((R-r)/r)\Theta)$$

and $$Y = (R-r)\sin\Theta - \delta \sin(((R-r)/r)\Theta)$$

Figure 7:
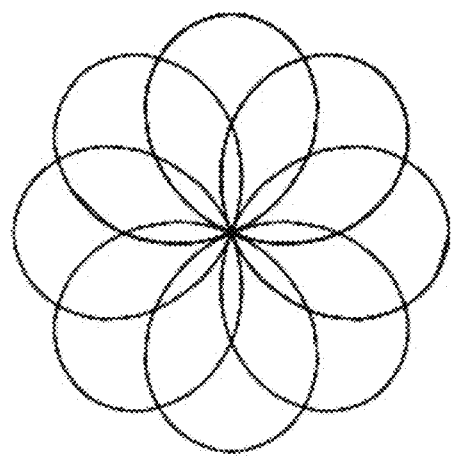
FIG. 7 is an example of a favored hypotrochoid pattern for the deflection of the cantilever.

When R=8, r=1, and $\delta$=7, the eight lobed pattern of FIG. 7 is formed, which is useful for this invention. Many hypotrochoids do not include the origin, and are not favored forms of the invention. One favored subset of hypotrochoids that include the origin and have lobes suited for use in this invention, are found when R−r=$\delta$, and all are integers. These hypotrochoids have R lobes.

Another related class of equations, hypocycloids, yield the types of motion that we recognize as highly useful for the present invention. These hypocycloids are hypotrochoids, except that d=r. They follow the general form:

$$X = (R-r)\cos\Theta + r\cos(((R-r)/r)\Theta)$$

and $$Y = (R-r)\sin\Theta - r\sin(((R-r)/r)\Theta)$$

where the smaller circle has radius r, and the larger circle has radius R. If we define R=kr, then the equations become:

$$x(\theta) = r(k-1)\cos\theta + r\cos((k-1)\theta)$$

and $$y(\theta) = r(k-1)\sin\theta - r\sin((k-1)\theta)$$

When k is any integer, the curve is closed, and has k inflection points. When k is a rational number, for example, k=p/q, then the curve will have p inflection points. However, none of the curves in this family pass through the origin, which is the preferred rest point for the oscillator.

Epitrochoids likewise do not pass through the origin, and are therefore non-favored mathematical forms for the present invention. The limaçon trisectrix does pass through the origin, and is a favored form for the present invention.

Roses are special cases of hypotrochoids. Certain Rose curves are favored. In polar coordinates, these follow the form:

$$r = \cos(k\Theta)$$

Figure 8:
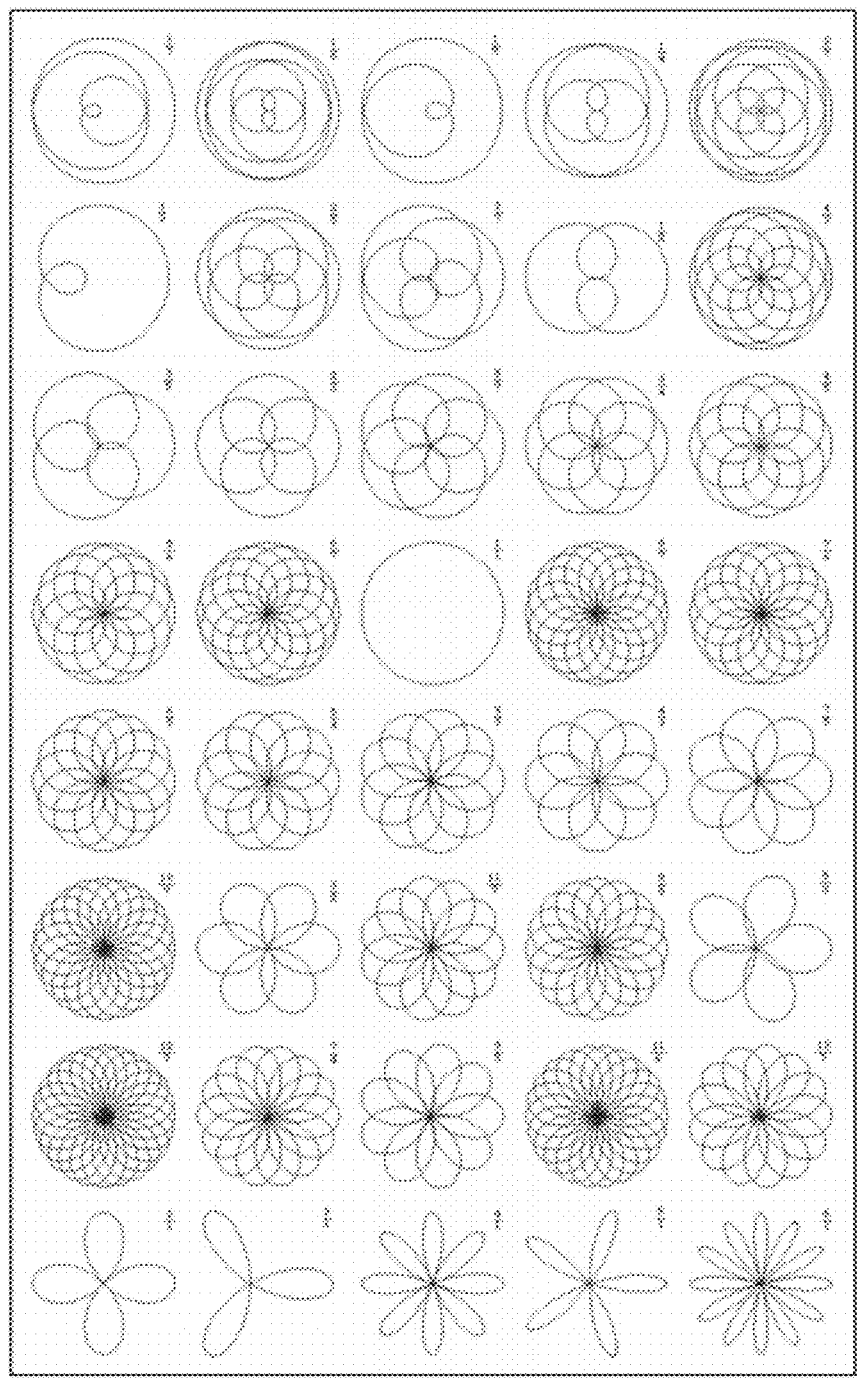
FIG. 8 is a chart of the multiple Rose curves that can be used for the deflection of the cantilever.

When k is an even integer, the curve will be rose shaped with 2k petals. If k is odd, then the curve will have k petals. A favored form for an eight contact multi-pole switch is created when k=4. FIG. 8 shows example rose figures that can be created from rational fractions p/q.

Another method of operating the multi-pole switch is to rotate the phase of the voltage applied to the field electrodes such that the cantilever follows the phase rotation and is attracted to electrodes in sequence.

Inflection points, where the velocity of the tip in either the X or Y direction goes through zero, can serve as good points for the location of electrical contacts. At the moment of contact, a conductive nanotube serves to bridge that contact and the base electrode, which may be at ground or another potential.

We recognize at least three forces operating in this device. The first is the electrostatic force from the applied field on the field electrodes. The second is Van der waals forces, which will tend to hold the cantilever at each contact electrode. The third force is the elastic restoring force of the bent cantilever.

Figure 9:
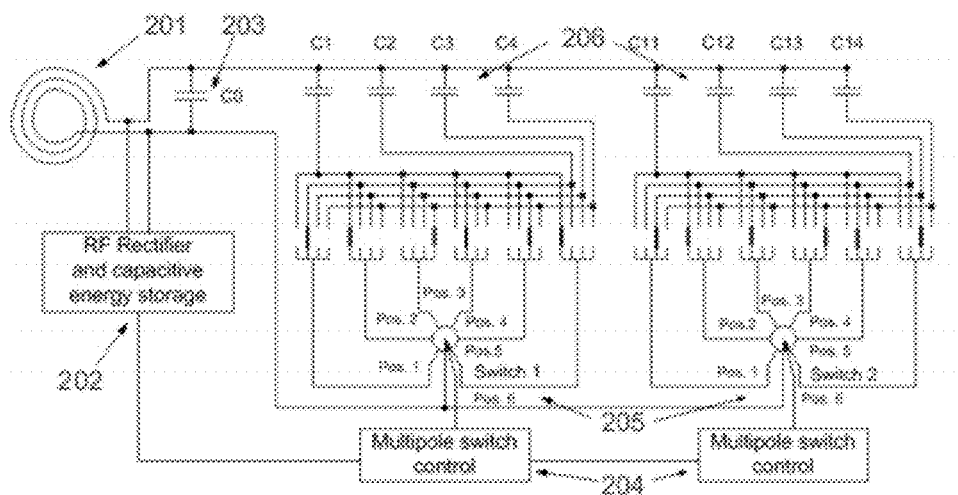
FIG. 9 is a wiring diagram for an RFID chip made using the multi-pole switch of the present invention.

FIG. 9 shows one example application of the multi-pole switch, here used for the creation of an RFID device. In such a device, an antenna could power a capacitor, which can then power the drive circuitry for the multi-pole switch. As the element oscillates following the prescribed Lissajous, Rose or other regular pattern, it will make contact with each of the poles of the multi-pole switch. When contact is made, a circuit is completed, which may add a certain value of capacitance to the resonant antenna circuit. The reading device can then measure the oscillation from each circuit, and determine the data encoded.

Referring to FIG. 9, such RFID device could comprise: an RF antenna 201, a rectifier and capacitor module 202 for energy storage as a method to provide power for the RFID system, a set of RF capacitors 203, 206 each connectable to the antenna through one or more of the multi-pole switches 205 (also sometimes referred to herein as Switch 1, Switch 2, etc., or as SW1, SW2, etc.), and driving circuitry 204 to control the nanoscale multi-pole switches.

Figure 10:
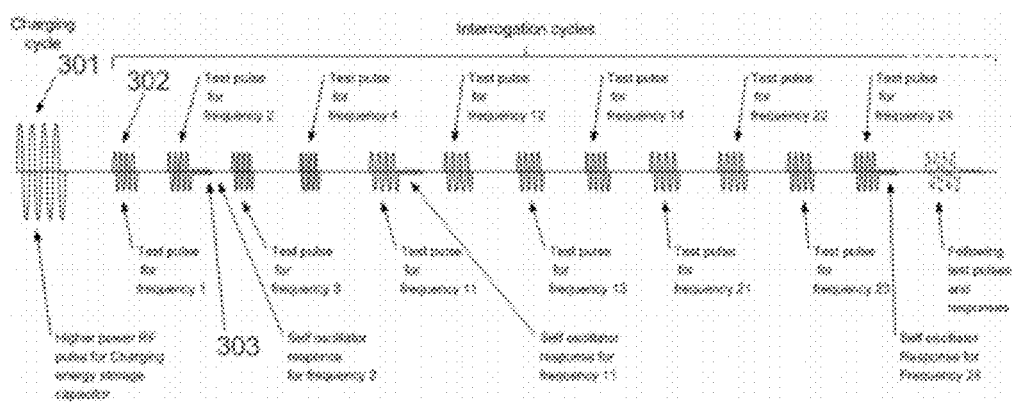
FIG. 10 is an illustration of a way to interrogate each channel in the RFID chip of FIG. 9.

FIG. 10 shows a method for the reading device to interrogate the RFID device. An initial pulse 301 is sent by the reader, which charges the capacitor responsible for running the device and the multi-pole switches. The reader then sends a series of test pulse frequencies 302, and measures the self oscillation response 303 for each test pulse. The value of the capacitors in each circuit will create a unique signature that can be read by the reader. The capacitors may be printed. By creating set variations of the circuits, data can be encoded in each circuit, and this data can be interrogated. The reading of this type of RFID device could be implemented using, for example, the following the operating sequence.

1. The reading device transmits a high energy RF pulse 301 at the self resonance frequency of the RF antenna.
2. The pulse from the reading device is received by the RF antenna, rectified and that energy is stored in a capacitor 202.
3. This energy is used to activate one or more multi-pole switches 205.
4. The switches connect a first pair of capacitors 206 to the RF antenna, depending on their wiring, which can be varied per device by printing the connective wiring.
5. The reading device sends N test frequency pulses, where N is the number of capacitors connectable to Switch 1 (FIG. 9) multiplied by the number of capacitors connectable to Switch 2 (FIG. 9), e.g. 16 (4×4). The reader listens for a response 303 at each frequency, to determine which capacitors are connected to the circuit.
6. One or both of the multi-pole switches rotate to connect a different pole, and the reading device sends another set of interrogation pulses and again listens for a response. This process continues until the reader can identify which capacitors are at each pole of the multi-pole switches.

If antenna 201 is in resonance, the self oscillation signal will provide information about the value of a capacitor connected in the connected position of the switch. With this method, we can implement a frequency-based, and/or a phase modulation-based, solution for any data sequence defined by the numerical position of the multi-pole switch.

FIG. 9 shows two switches, Switch 1 and Switch 2, which can be oscillated using the same frequency or a different frequency.

If, for example, the frequency of Switch 1 (SW1) and Switch 2 (SW2) are the same, the device will be interrogated following the pattern SW1-P1+SW2-P1, SW1-P2+SW2-P2, SW1-P3+SW2-P3, and so on, where P1-Pn are the number of poles in the switch. In FIG. 9, SW1-P1 may connect to any of four capacitors, while SW2-P1 may connect to any of four other capacitors. In such a state, 16 possible combinations (4×4) exist for the value of SW1-P1+SW2-P1. For example, the four capacitors connectable to SW2 could have values of 5, 10, 15 and 20 pF, and the four capacitors connectable to SW1 could have values of 1, 2, 3 and 4 pF. The total capacitance, C, will equal $C_0+C_{switch1}+C_{switch2}$. If $C_0$=24 pf, the 16 combinations that can be made will have values between 30 (1+5+24) and 48 (20+4+24) pF. Note that 10, 15 and 20 pF are not possible to produce in this example. With 16 combinations, this first combination has 4 bits of data.

When we shift to SW1-P2+SW2-P2, there are again 16 possible combinations for another 4 bits of data. For the case where both SW1 and SW2 are six position switches, then the total number of bits that can be stored is 24.

Of course, it is possible to increase or decrease the number of capacitors and the number of poles possible for each switch, and the number of switches provided, and their arrangement in the circuit, so as to create systems that can encode a desired number of bits.

For the two-switch system with 4 capacitors each, the reader must deliver 16 (4^2) interrogation pulses per pole to determine which value the pair of switches has been assigned. Accordingly, the pulses must be short, compared to the time that the oscillating element spends in contact with each pole.

Another method is to build Switch 1 to oscillate at ⅙ the frequency of Switch 2 (given that Switch 2 is a six position switch). In this case, the device will be interrogated sequentially following the pattern: SW1-P1+SW2-P1, SW1-P1+SW2-P2, SW1-P1+SW1-P3 . . . SW1-P6+SW2-P6. In the following example, Switch 1 connects to C1-C4 having values of 1, 2, 3 and 4 pF, and Switch 2 connects to C11-C14 having values of 5, 10, 15 and 20 pF. The smallest capacitance combination is 6 pF, and the largest is 24 pF, neglecting Co. For SW1-P1+SW2-P1, there are 16 possible combinations (4 capacitors for SW1 and 4 capacitors for SW2, 4×4=16), equivalent to 4 bits of data. When a switch moves to interrogate SW1-P1+SW2-P2, the value of SW1 has not changed, so there are only four additional capacitor combinations (2 bits) that can be created per pole. In this example, there is 1 pole with 4 bits, and 5 poles with only 2 bits, for a total of 14 bits (5×2+4 bits).

Figure 11:
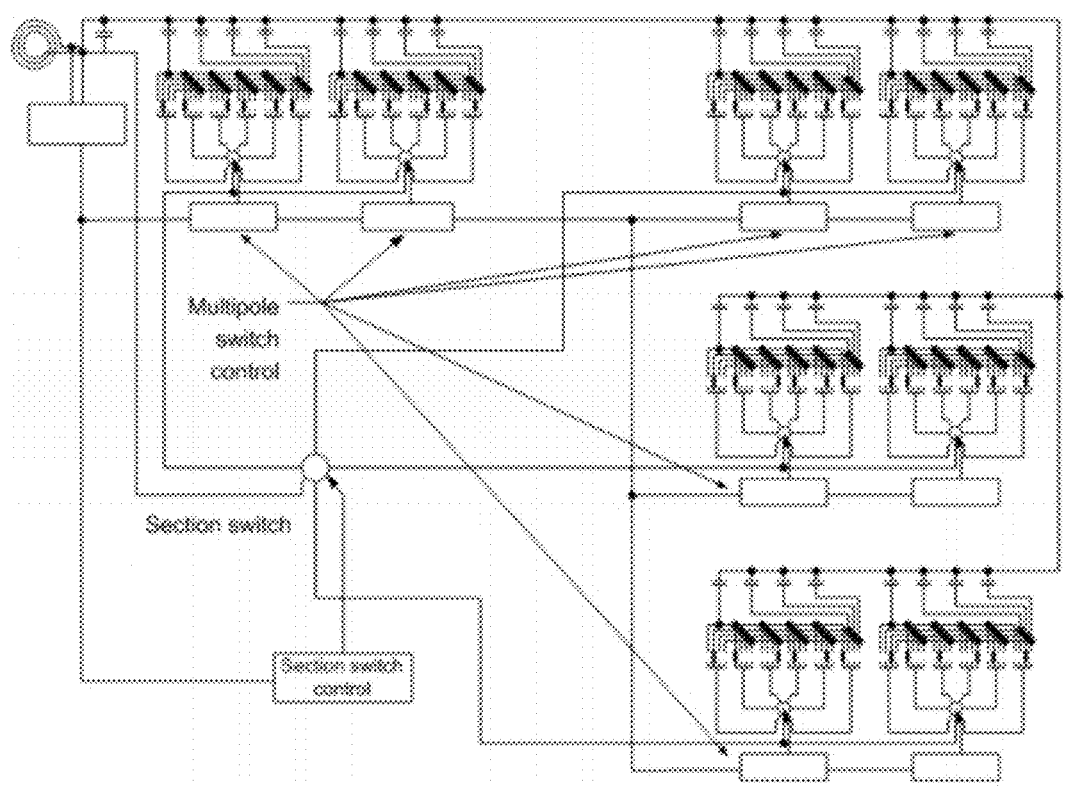
FIG. 11 is a cascaded switch design that enables longer message encoding and reading.

Yet another method of designing and operating the device is to incorporate a four position multi-pole switch to select a section, followed by four sets comprising two multi-pole switches, as shown in FIG. 11. To one skilled in the art, this construction would be recognized as allowing substantially longer data sets to be stored. Similar to the aligned nanotubes that make up the multi-pole switch, the wiring of the individual capacitors may be accomplished using electrostatic forces. A single vertically aligned cantilever can be electrostatically placed into contact with one of four capacitor leads in FIG. 9 or FIG. 11. Van der Waals forces can keep the cantilever in contact with the electrode, allowing the wiring to be persistent, yet resettable if needed.

Figure 12:
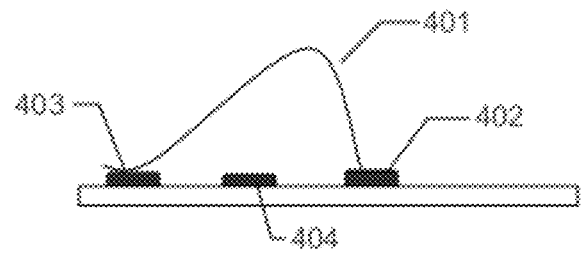
FIG. 12 illustrates a cantilever being used as a jumper over another circuit trace.

It is also important to note that the contacts made by bent electrostatic cantilevers can be used as a "jumper" wire, to avoid having to make vias and/or dual plane electronics. An image showing a jumper wire is shown in FIG. 12. Here, a nanotube or other bent cantilever 401 makes a connection from a first contact 402 to a second contact 403 while bridging a third contact 404. Two cantilevers could be used to bridge larger gaps if needed, with the two cantilevers meeting in the middle.

Figure 13:
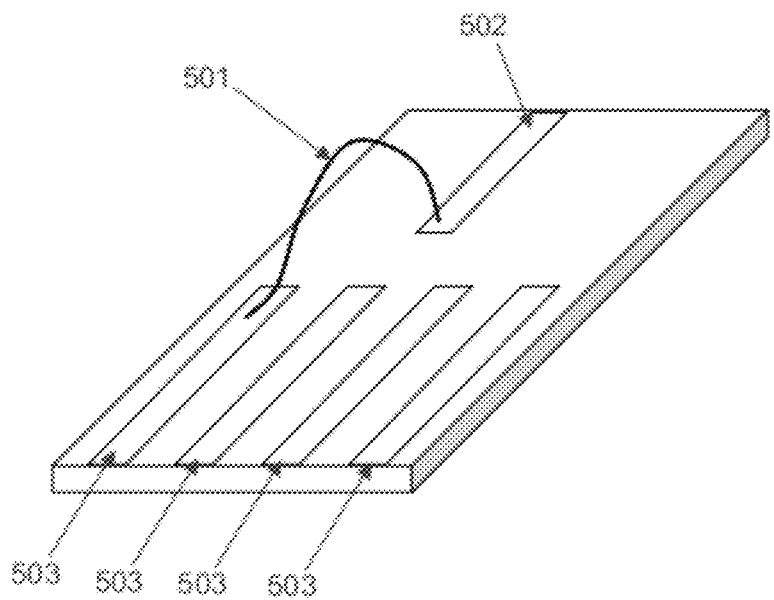
FIG. 13 illustrates a bent cantilever touching one of multiple contacts in a plane.

Referring to FIG. 13, a cantilevered nanotube 501 connected to an electrode 502 is bent into contact with one of a number of possible electrodes 503, all sharing the same plane. Van der Waals forces can hold the nanotube in this position after the field has been removed, creating a set position that will be retained. This enables "wiring" of circuitry via electrostatic means.

The preceding examples should be construed as exemplary and non-limiting, as other methods of interrogating an RFID device are also possible using the multi-pole switch. Also, other methods can be used to charge a capacitor. One additional method is the use of piezoelectric films, such as PVDF, to convert mechanical energy to electrical energy, which can then be stored by a capacitor. Solar cells could also be used. Piezoelectrics may also find use in the driving circuitry, as crystal oscillators can create the oscillation frequencies required by the field electrodes of the multi-pole switch structure.

MODIFICATIONS

It is to be understood that the present invention is by no means limited to the particular constructions herein disclosed and/or shown in the drawings, but also comprises any modifications or equivalents within the scope of the invention.

What is claimed is:

1. A multi-pole switch comprising:
   (a) a conducting substrate having a top surface;
   (b) at least three field electrodes mounted above, and electrically isolated from, each other and from said top surface of said conducting substrate;
   (c) a conductive cantilever element having a first end portion secured to said top surface of said conducting substrate, an opposite second free end portion positioned in spaced relation to said field electrodes and operable in response to an electrostatic or electrodynamic charge established between said cantilever element and said field electrodes to deflect in a direction towards said field electrodes; and
   (d) a plurality of contact electrode poles mounted above, and electrically isolated from, said top surface of said conducting substrate below the top of said cantilever element second free end portion and above said field electrodes and positioned to contact said cantilever element as said cantilever element is deflected in a direction defined by the net field applied by said field electrodes.

2. A multi-pole switch according to claim 1 comprising at least two pairs of field electrodes.

3. A multi-pole switch according to claim 1 wherein said cantilever element comprises a nanotube.

4. A multi-pole switch according to claim 1 wherein said cantilever element comprises a nanofiber.

5. A multi-pole switch according to claim 1 wherein said cantilever element comprises carbon.

6. A multi-pole switch according to claim 1 wherein said cantilever element is metallic.

7. A multi-pole switch according to claim 1 wherein said cantilever element is metal tipped.

8. A multi-pole switch according to claim 1 wherein said cantilever element is metal-coated.

9. A method for switching a signal, the method comprising: providing a multi-pole switch comprising:
   (a) a conducting substrate having a top surface;
   (b) at least three field electrodes mounted above, and electrically isolated from, each other and from said top surface of said conducting substrate;
   (c) a conductive cantilever element having a first end portion secured to said top surface of said conducting substrate, an opposite second free end portion positioned in spaced relation to said field electrodes and operable in response to an electrostatic or electrodynamic charge established between said cantilever element and said field electrodes to deflect in a direction towards said field electrodes; and
   (d) a plurality of contact electrode poles mounted above, and electrically isolated from, said top surface of said conducting substrate below the top of said cantilever element second free end portion and above said field electrodes and positioned to contact said cantilever element as said cantilever element is deflected in a direction defined by the net field applied by said field electrodes; and
   applying a voltage to said field electrodes and applying a signal to said contact electrodes.

10. A method according to claim 9 wherein a sinusoidal wave form is applied to a pair of field electrodes.

11. A method according to claim 9 wherein a sinusoidal wave form is applied to a first pair of field electrodes, and a second sinusoidal wave form with a phase delay relative to the first wave form is applied to a second pair of field electrodes.

12. A method according to claim 9 wherein two different sinusoidal wave forms are applied to two different pairs of field electrodes.

13. The method according to claim 12 wherein the sinusoidal wave forms applied to the field electrodes result in the cantilever moving in a Lissajous pattern or Rose pattern.

14. The method according to claim 13 wherein the arrangement of the plurality of contact electrode pads coincide with the inflection points or lobes of a Lissajous or rose pattern.

15. A switch comprising:
   a cantilevered, nanoscale element extending from a substrate;
   two or more field electrodes orthogonal to said element; and
   two or more contact electrodes, wherein said field electrodes are stimulated by different voltage sources.

16. A multi-pole switch structure comprising:
   a cantilevered nanoscale element extending from a substrate;
   one field electrode positioned along the length of said element, providing a gap therebetween;
   a second field electrode positioned substantially orthogonal to the first field electrode; and
   two or more contact electrodes positioned along the length of said element.

17. A switch made from a cantilevered conductive filament that oscillates in a closed loop pattern, making contact between said cantilevered conductive filament and electrical contacts that are placed along the path of the closed loop.

18. The switch of claim 17 wherein the conductive filament is a carbon nanotube.

19. The switch of claim 17 wherein the closed loop pattern is a Lissajous figure with four or more points of inflection.

20. The switch of claim 17 made from a multiwall carbon nanotube, which can telescope to elongate under a suitable electric field, and change its resonant frequency thereby.

21. A radio frequency identification device, comprising:
   an antenna;
   a charging circuit;
   one or more multi-pole switches driven by oscillating voltages; and
   capacitors which can be connected to the individual poles.

* * * * *